United States Patent Office 3,036,044
Patented May 22, 1962

3,036,044
PROCESS FOR THE MANUFACTURE OF LINEAR POLYESTERS AND COPOLYESTERS CONTAINING PHOSPHINATE STRUCTURAL COMPONENTS
Anthony Arthur Briarly Browne and John Mather, both of Harrogate, England, assignors to Imperial Chemical Industries Limited, London, England, a corporation of Great Britain
No Drawing. Filed Oct. 27, 1959, Ser. No. 848,929
Claims priority, application Great Britain Nov. 5, 1958
3 Claims. (Cl. 260—75)

This invention relates to a process for the manufacture of polyesters, in particular the manufacture of aromatic polyesters and copolyesters containing phosphorus.

It is known from Belgian Patent 568,816 to prepare synthetic linear copolyesters containing phosphinate groups which exhibit enhanced affinity for dyestuffs. In particular there are described polymers of glycol terephthalate esters into which phosphinate groups have been incorporated. A phosphinate group having the structure

where M is a metal may be introduced into a linear polyester if appropriate functional groups are attached, for example as in the component

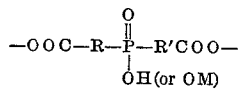

where R and R' are organic linkages such as aliphatic or aromatic hydrocarbon.

It has not been possible to prepare such polyesters and copolyesters from the free bis carboxy substituted phosphinic acids by conventional polycondensation techniques since these acids are trifunctional in character and therefore cause cross linking and gelation. Similar difficulties have been encountered with the bis carboxy substituted phosphinates where disproportionation of the cation may occur between the phosphinic and carboxylic acid groups so that trifunctional components are again present. The routes hitherto adopted in making these polymers have therefore been circuitous, for example by esterification of both carboxylic and phosphinic acid groups followed by conversion of the phosphinic acid ester to the phosphinic acid salt.

According to our invention we provide a process for the preparation of polyesters and copolyesters containing the structural component.

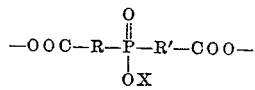

where R and R' are organic linkages and X is a cation forming a salt of the phosphinic acid, characterised in that the acid

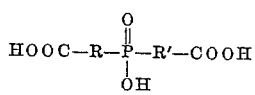

is reacted with a diol in the presence of a halide or pseudo halide of the cation X and the resultant diol esters are polycondensed. In this way it is possible to esterify the carboxylic acid groups while at the same time forming the salt of the phosphinic acid. By pseudo-halide is meant a salt such as a cyanide or cyanate which has properties similar to a true halide. Among halides we have found those of the alkali metals or alkaline earth metals, particularly the iodides, to be very effective.

The diol esters produced in the process of our invention may consist solely of phosphinates and these may be directly polycondensed to yield a polyester having a high phosphorus content. We have, however, found that our process is most useful in the manufacture of copolyesters wherein the proportion of phosphinate is low, being present to the extent of less than ten mols. percent of the final polymer. Most effective results have been obtained when the groups R and R' are phenylene and the carboxy substituents are in the para position. In this way we have prepared polyethylene terephthalate modified by the addition of a small amount of bis (para-carboxyphenyl) phosphinate which is a valuable source of fibres having good affinity for basic and dispersed dyestuffs.

In the preparation of these copolyesters all the reactants may be combined in the first place. For example terephthalic acid, bis (para-carboxyphenyl) phosphinic acid and ethylene glycol may be reacted in the presence of sodium iodide to yield mixed ethylene glycol terephthalate and phosphinate esters. Alternatively separate esterifications may be carried out, for example to yield bis (β-hydroxyethyl) terephthalate and a bis (β-hydroxyethoxy carbonyl phenyl) phosphinate, and the products combined for polycondensation.

Polycondensation is carried out in known manner under reduced pressure at elevated temperatures in the presence of a suitable catalyst. Metallic substances, such as compounds of antimony, are good catalysts and it is, of course, possible to have the same metal present in both the halide and polycondensation catalyst.

The following examples are provided for the purpose of illustrating our invention.

EXAMPLE 1

A clear melt was obtained by heating dimethyl terephthalate (7.3 parts), ethylene glycol (5.2 parts) and zinc acetate (0.001 part) under a short fractionating column so that methanol was distilled continuously from the reaction mixture. Bis (p-carboxyphenyl) phosphinic acid (0.60 part), sodium chloride (0.115 part) and ethylene glycol (10 parts) were similarly heated under reflux for two hours to give a clear melt. The two melts were combined, antimony oxide (0.002 part) added, and excess glycol distilled off. The reactants were finally maintained at 280° C. and 0.1 mm. for 55 minutes, a clear polymer being obtained having crystalline melting point 230–235° C. from which fibres could be spun and drawn.

Comparative Example A

Terephthalic acid (52.7 parts), bis (p-carboxyphenyl) phosphinic acid (5.1 parts) and ethylene glycol (70 parts) were heated under a short fractionating column so that water was continuously distilled from the reaction mixture. Antimony oxide (0.015 part) were added, excess glycol distilled off and the reactants maintained at 280° C. and 0.1 mm. for 55 minutes. A gel was obtained which did not melt below 280° and decomposed on further heating.

Comparative Example B

A melt was obtained by heating dimethyl terephthalate (9.2 parts), ethylene glycol (6.5 parts) and zinc acetate (0.0014 part) under a short fractionating column so that methanol was distilled continuously from the reaction mixture. A similar melt was obtained by heating bis (p-carboxyphenyl) phosphinic acid (0.765 part), sodium carbonate (0.265 part) and ethylene glycol (10 parts) under reflux for 2 hours. The two melts were combined, antimony oxide (0.002 part) added and excess glycol distilled off. At this stage extensive precipitation occurred and a normal polymer could not be obtained.

What we claim is:

1. The process for the preparation of linear fiber- and film-forming copolyesters of ethylene glycol, terephthalic acid, and bis(carboxyphenyl)phosphinic acid, which process consists essentially in reacting bis(carboxyphenyl)phosphinic acid with ethylene glycol in the presence of a salt selected from the class consisting of the halides, cyanides, and cyanates of alkali metals and alkaline earth metals, to form the metal salt of the diol ester, bis(hydroxyethoxycarbonylphenyl)phosphinic acid, and polycondensing this metal salt-diol ester together with bis(beta-hydroxyethyl)terephthalate to form a polyethylene glycol terephthalate linear copolyester having in the linear chain the structural component:

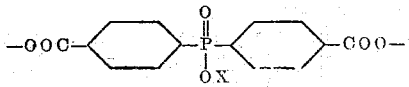

wherein X is selected from the class consisting of alkali metal and alkaline earth metal cations.

2. A process according to claim 1 wherein bis (carboxy phenyl) phosphinic acid is reacted with ethylene glycol and an alkali metal halide and the resultant metal salt of bis (hydroxyethoxycarbonyl phenyl) phosphinic acid is polycondensed together with bis (β-hydroethyl) terephthalate.

3. A process according to claim 2 wherein the bis (carboxy phenyl) phosphinic acid is bis (para-carboxy phenyl) phosphinic acid, and the molar ratio of bis (para-hydroxyethoxycarbonyl phenyl) phosphinate to bis (β-hydroxyethyl) terephthalate does not exceed 1:9.

References Cited in the file of this patent

UNITED STATES PATENTS

| | | |
|---|---|---|
| 2,646,420 | Morgan | July 21, 1953 |
| 2,911,389 | Pernert | Nov. 3, 1959 |